United States Patent [19]

Kennedy

[11] Patent Number: 4,834,210
[45] Date of Patent: May 30, 1989

[54] APPARATUS FOR GENERATING SEISMIC WAVES

[75] Inventor: William S. Kennedy, Sunnyvale, Calif.

[73] Assignee: Western Atlas International, Inc., Houston, Tex.

[21] Appl. No.: 136,148

[22] Filed: Dec. 21, 1987

[51] Int. Cl.$^4$ .............................................. G01V 1/40
[52] U.S. Cl. ..................................... 181/106; 181/402; 367/912
[58] Field of Search ............... 181/102, 103, 104, 105, 181/106, 113, 120, 142, 401, 402, 0.5; 367/25, 84, 143, 911, 912; 166/177, 249

[56] References Cited

U.S. PATENT DOCUMENTS

| | | | |
|---|---|---|---|
| 4,632,212 | 12/1986 | Benzing | 181/106 |
| 4,671,379 | 6/1987 | Kennedy et al. | 181/106 |
| 4,716,555 | 12/1987 | Bodine | 367/35 |
| 4,722,417 | 2/1988 | Selsam | 181/119 |
| 4,734,892 | 3/1988 | Kotlyar | 367/83 |

Primary Examiner—Brian S. Steinberger
Attorney, Agent, or Firm—Barry C. Kane

[57] ABSTRACT

An improved apparatus for generating a seismic wave in a borehole in the earth is disclosed. A portion of the borehole, which may be the bottom of the hole or any other point along its length, is selected as the site for seismic wave generation. A device is provided to oscillate the borehole fluid in a selected portion of the borehole to establish a resonant standing pressure wave of desired frequency within the fluid. The wave is maintained by continuing to supply energy to the fluid to replace losses due to fluid friction, structural losses and radiated acoustic energy. The standing wave thus created is radiated through the borehole wall into the earth and is eventually received by seismic detectors located on the surface.

12 Claims, 4 Drawing Sheets

APPARATUS FOR GENERATING SEISMIC WAVES

BACKGROUND OF THE INVENTION

CROSS REFERENCE TO RELATED PUBLICATIONS

This invention is related to U.S. Pat. No. 4,671,379 issued June 9, 1987 and assigned to the assignee of this invention.

1. Field of the Invention

This present invention is related to sources of generating seismic waves in the earth and more particularly to an apparatus for generating seismic waves substantially below the surface of the earth within a borehole.

2. Discussion of the Related Art

In the exploration of economic natural resources, it is desirable to determine as much as possible about the nature of the subsurface structure and lithology. Many techniques have been developed over the years in efforts to obtain such information. A commonly used technique is by using seismic exploration wherein a plurality of seismic detectors are disposed over the surface of the earth in a predetermined array. A seismic source such as a vibrator or pneumatic gun may generate an acoustic signal in the vicinity of the seismic detectors which receive the reflected acoustic signals from the subsurface strata. From this data, geologists and geophysicists are able to ascertain subsurface characteristics.

Once actual drilling of a well has begun in a selected area, it is typical to gather as much data as possible about the subsurface from the well. Drill rates and drill cuttings provide valuable information about the lithology. In addition, special instruments can be lowered down the borehole from time to time and the data analyzed. Another useful technique is to place an array of seismic detectors around the borehole at a predetermined radius and to generate a seismic signal deep in the borehole. This technique can provide valuable information concerning structure around the borehole as well as propagation velocities in the subsurface.

A major problem in the past for generating seismic signals deep in a borehole has been the kind of source to use. The use of explosives, once commonly used, now has limited application. The size of the explosive charge to provide the desired signal typically results in severe damage to the borehole itself. Another is the use of water or air guns, but the explosive pulses from these sources may result in damage to the borehole as well. Other techniques have been proposed such as dropping a heavy weight on the bottom of the borehole to generate the seismic signal, but this too may result in damage to the borehole.

None of the techniques mentioned above have proven entirely satisfactory and there remains a long-standing need within the industry for an improved apparatus to generate a powerful seismic signal in a borehole.

SUMMARY OF THE INVENTION

The present invention provides an improved apparatus for generating a seismic wave in a borehole. A portion of the borehole, which may be the bottom of the hole or any other point along its length, is selected as the site for seismic wave generation. The instant invention is provided to oscillate the fluid within the selected portion of the borehole to establish a resonant standing pressure wave of desired frequency. The wave is maintained by continuing to periodically supply energy to the fluid to replace losses due to fluid friction, structural losses and radiated acoustic energy. The standing wave thus created is radiated through the borehole wall into the earth and is eventually received by seismic detectors located on the surface.

The device may take various forms which are described in detail hereinafter. In one embodiment, a pair of resilient bladders are positioned in the borehole and spaced apart from each other by a predetermined vertical distance. The fluid in the borehole space between the bladders may be excited into oscillation by a rotating valve to produce a standing wave. In another embodiment, a single gas bladder is provided spaced vertically downhole a predetermined distance from a rigid blocking member. The drilling fluid between the rigid blocking member and the gas bladder is then excited into oscillation by a similar valve to produce a standing wave.

An important feature of the invention is the creation of a resonant standing wave in a portion of the borehole by oscillating a borehole fluid between two vertically spaced apart end members. The invention is not limited to confined fluid volumes, but includes other borehole techniques wherein an identifiable column of fluid is excited into resonant oscillation.

The fluid is excited in the borehole by the periodic introduction of additional fluid at the proper frequency to sustain the pressure standing wave. The fluid may be introduced by a rotary valve having at least one conduit which becomes aligned periodically with ports defined through the tool housing, emitting the fluid therethrough upon alignment. Another technique to introduce the fluid is by way of a reciprocating piston which opens and closes ports for communicating the fluid.

An advantage of the present invention is the high energy efficiency. Because of the fluid column is made to oscillate at or near resonance, a relatively larger pressure oscillation can be produced with a relatively small amount of input power.

A further advantage of the present invention is that it provides an apparatus for use down a borehole wherein the resonant frequency can be easily changed so that seismic waves can be produced at select ones of several frequencies or wide frequency bands can be swept as desired.

A still further advantage of the present improvement is to provide an apparatus for use downhole wherein fewer moving parts are required to cause the borehole fluid to resonate.

BRIEF DESCRIPTION OF THE DRAWINGS

A far more detailed explanation of the present invention will be provided by reference to the following description of the preferred embodiments and by reference to the drawing figures, wherein.

DESCRIPTION OF THE PREFERRED EMBODIMENTS

Figure 1:
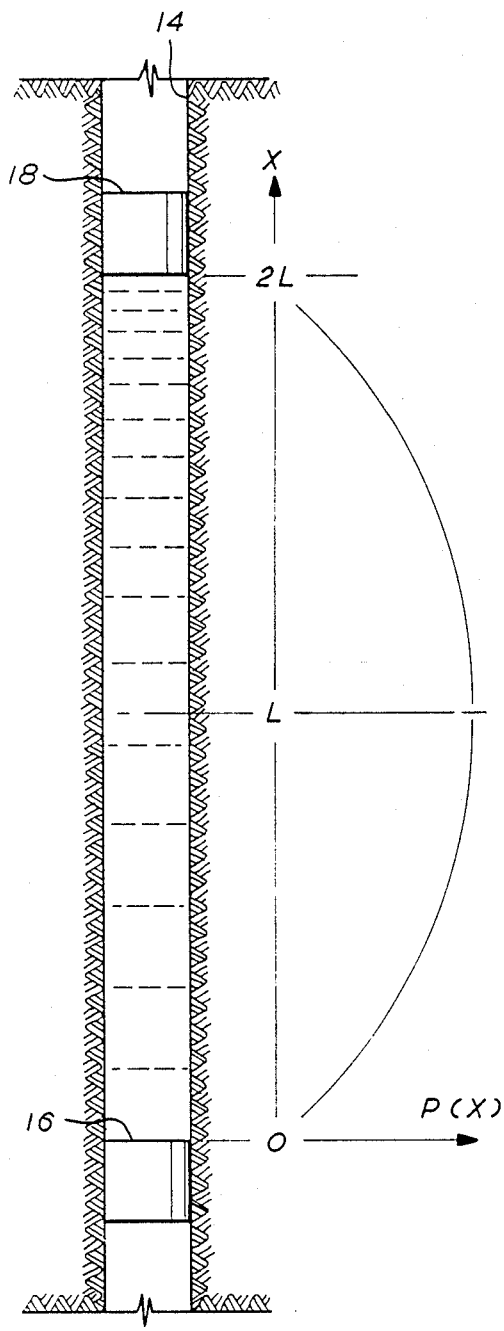
FIG. 1 is a schematic representation of the operation of the present invention within a borehole in a half-wave configuration.

The fundamental operational theory of the invention is initially described in U.S. Pat. No. 4,671,379 incorporated herein by reference, but will briefly be described with reference to FIGS. 1 and 2. In those figures, a borehole 14 is shown penetrating the surface of the earth. At a location of interest within the borehole may be a resilient plug member generally indicated as 16. A second plug member 18 may be located a preselect distance uphole. A fluid, such as drilling fluid, is captured in the volume between the two plugs 16 and 18. In the embodiment illustrated in FIG. 1, the plugs 16 and 18 may contain a resilient bladder. In the embodiment shown in FIG. 2, only plug 16 may contain a bladder, while plug 18 would act as a rigid non-compressible block placed in the borehole 14.

Figure 2:
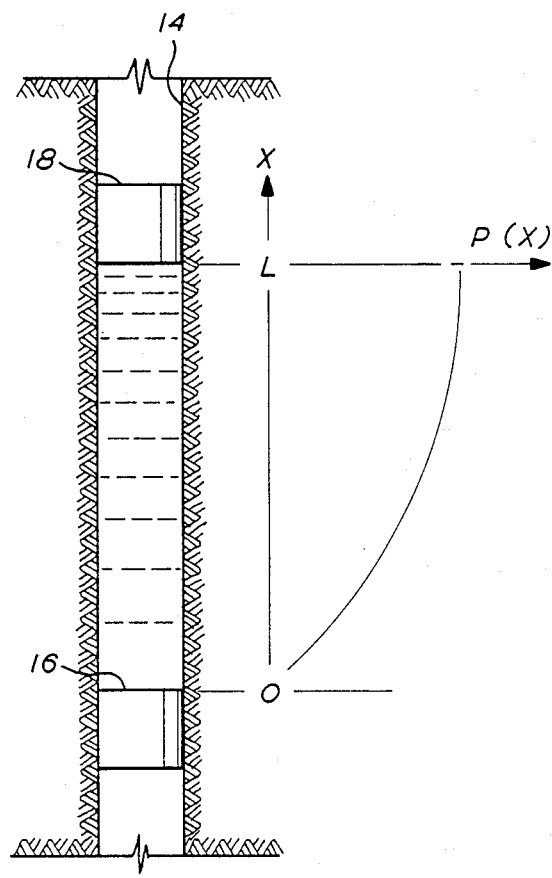
FIG. 2 is a schematic representation of the operation of this invention in a quarter-wave configuration.

FIGS. 1 and 2 schematically illustrate the principles of operation of the two embodiments. The letter x indicates the distance along the vertical axis of the borehole. The numeral 0 indicates the beginning of the length of interest occurring at the bottom of the face of the upper operating head. The letter L indicates that length along the x axis wherein the peak pressure amplitude occurs in a sinusoidal wave, and 2L indicates that point in which the pressure excursion decays to 0, which in resonance takes place at the top of the lower operating head.

The pressure is a function of location along the borehole between the operating heads and time is given by the equation:

$$P_{(x,t)} = P_0 \sin(\pi Ct/2L)\sin(\pi x/2L) + P_B$$

where

C 32 borehole fluid compressional sound speed;
$P_B$ = borehole static pressure;
$P_0$ = the maximum driven dynamic pressure;
t = time
x = distance along the borehole Hence, the frequency of the oscillator is given by the equation:

$$f = C/4L$$

In the arrangement shown in FIG. 1, the fluid motion is zero at x equal to L and maximum at x equal to 0 and x equal to 2L. In the embodiment illustrated in FIG. 2, the fluid motion would also be zero at x equal to L and maximum at x equal to 0.

In order to allow the fluid to oscillate between the operating heads, it is necessary to provide a resiliency at the points of maximum fluid motion. Hence, in the embodiment shown in FIG. 1, both operating heads 16 and 18 would be provided with resilient gas bladders as described in U.S. Pat. No. 4,671,379 whereas in the embodiment as shown in FIG. 2, the operating head 18 would be rigid and the operating head 16 would be provided with a resilient gas bladder.

From the foregoing description, it can be seen that the frequency of oscillation of the fluid between the operating heads can be controlled by varying the distance therebetween. It will be understood that the selection of the particular operation head can be varied by those skilled in the art.

The theory of the invention is to provide a situation wherein a desired acoustic mismatch occurs between the fluid in the borehole and the plugs 16 and 18. In the embodiment shown in FIG. 1, the plugs 16 and 18 would have a lower acoustic impedance than the borehole fluid. In the embodiment shown in FIG. 2, the plug 16 may have a lower acoustic impedance than the borehole fluid, and the plug 18 would have a higher acoustic impedance than the fluid.

In the technique illustrated in FIG. 1, the plugs 16 and 18 would be spaced so that when the fluid between them was excited into oscillation one-half of a standing wave would be created between the plugs. In the operation of the device illustrated in FIG. 2, the distance between the plugs 16 and 18 would be such that one-quarter of a standing wave would be created between the plugs when the fluid was excited into oscillation.

Figure 3:
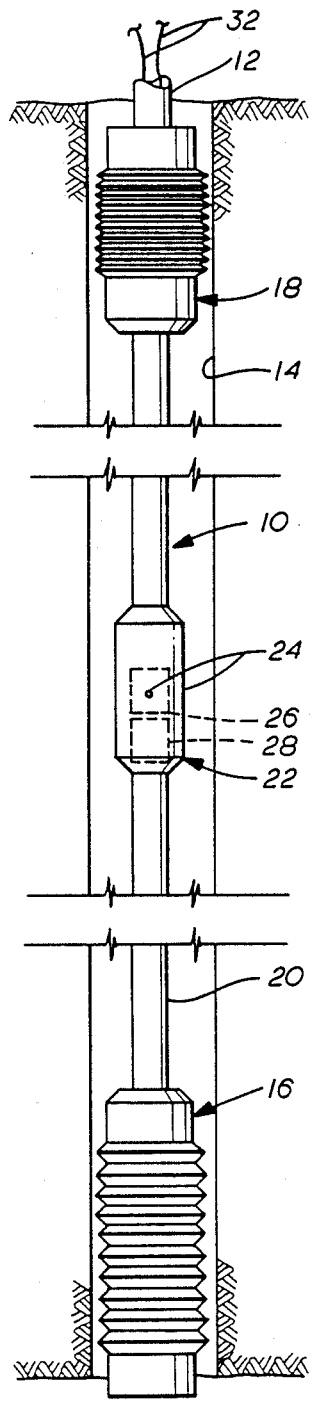
FIG. 3 is an elevational view of an embodiment for operation in FIG. 1.

FIG. 3 is a general illustration of a device 10 embodying the instant invention. The device 10 comprises an elongated tool adapted to be lowered and located at a predetermined depth within a borehole 14. At the upper end of the tool is an operating head 18 which substantially plugs the borehole 14. Above operating head 18 is an extension 12 of the tool 10 which may continue to the surface or terminate in a clevis to suspend the tool in the borehole and allow operation as to be described later. Located at the lower end of the tool 10 may be an operating head 16 substantially identical to head 18. A conduit 20 is located substantially between and interconnects the operating heads 16, 18 and includes a centrally located actuator assembly 22 as shown in greater detail in FIG. 5. Actuator assembly 22 may contain a plurality of exhaust ports 24 located equidistantly around the circumference of the assembly. Although a plurality of exhaust ports 24 are preferred, at least one is required. Each exhaust port 24 is in fluid communication with a valve mechanism 26 operated by a drive mechanism 28, both to be described in greater detail below.

The details of the operating heads 16 and 18 will not be described but are described in U.S. Pat. No. 4,671,379 incorporated herein. However, it should be noted that both heads are movable and that head 18 is shown in a substantially contracted position, whereas head 16 is shown in substantially an extended position.

Figure 4:
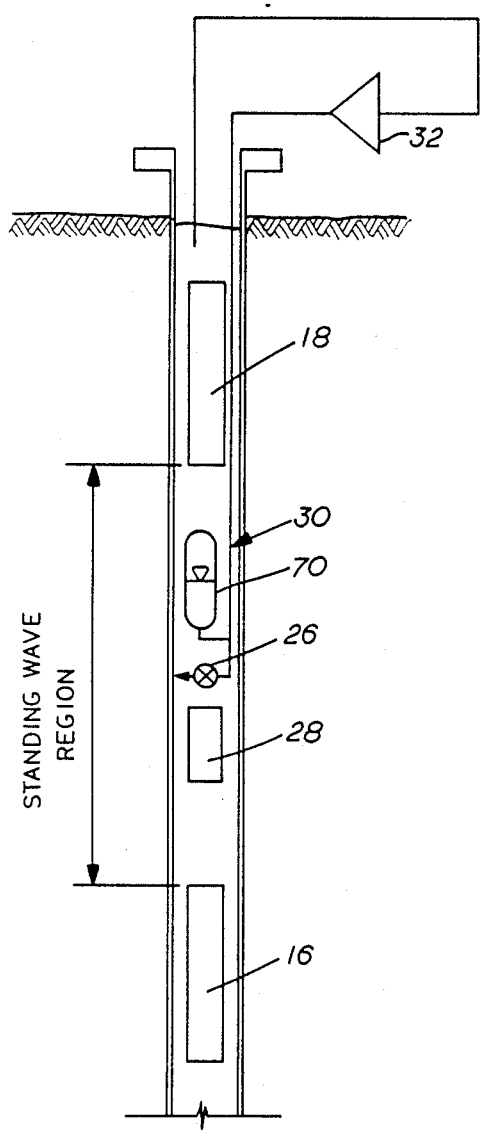
FIG. 4 is a fluid schematic of the embodiment shown in FIG. 3.

FIG. 4 is a generalized schematic of the device 10 shown in FIG. 3. In FIGS. 3 and 4, the borehole 14 is typically drilled into the surface of the earth in a vertical orientation. At a predetermined location of interest, tool 10 is lowered and positioned such that the operating head 16 is placed at one location, and the other operating head 18 is located at a preselect distance uphole. The actuator assembly 22 having the valve and drive mechanism, 26 and 28 respectively, is located between the two heads 16, 18. The valve mechanism 26 may be in fluid communication through a supply conduit 30 with a pump 32 located at the surface. Pump 32 in turn may draw fluid from the borehole 14. The fluid within the borehole is typically a drilling fluid which will be discussed below. The drilling fluid within the borehole 14 is captured in the space defined between the two operating heads 16 and 18. A pulsation damper 70 may be added above valve 26 to reduce pressure fluctuations upstream of valve 26. Although the pump 32 is shown on the surface, it may also be configured as part of the tool 10 and electrical power supplied to it from the surface.

In the technique illustrated in FIGS. 1, 3 and 4, the operating heads 16 and 18 are spaced apart so that when the fluid trapped therebetween is excited into oscillation by the valve mechanism 26, one-half of a standing valve is created between the heads.

Figure 5:
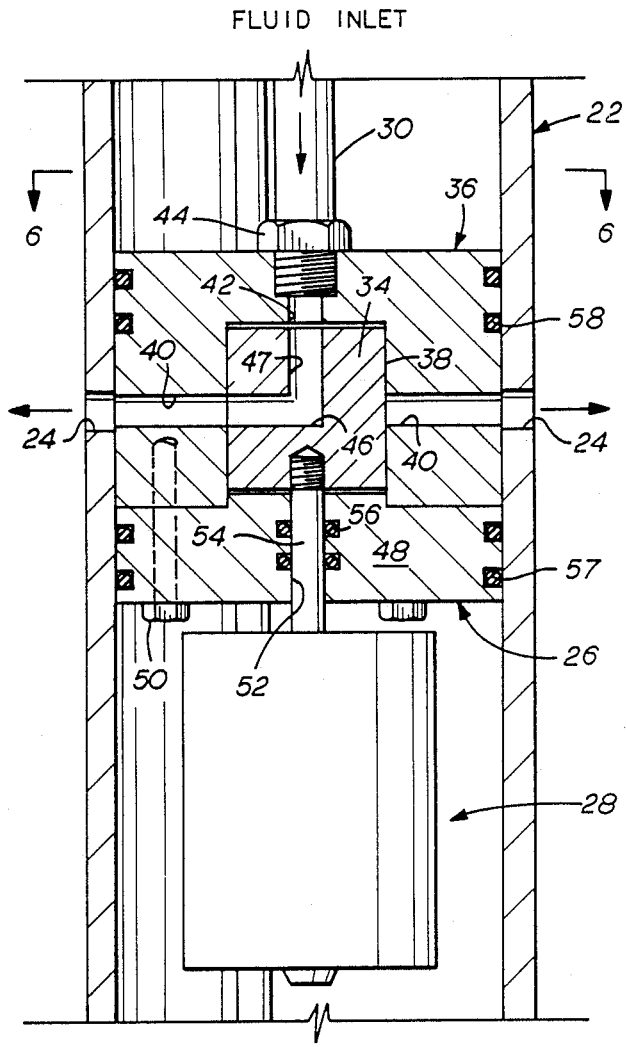
FIG. 5 is an enlarged elevational cross-section of the central portion shown in FIG. 3.

An mentioned earlier, FIG. 5 is an enlarged elevational view of the actuator assembly 22 shown in partial cross section. The actuator assembly is basically comprised of at least one, but preferably more exhaust ports 24 located about the actuator assembly exterior. Each exhaust port is intermittently in fluid communication with a valve mechanism 26 located within the actuator assembly. Valve mechanism 26 may be comprised of a cylindrical member 34 concentrically disposed within a housing 36 having a chamber 38 with a diameter substantially similar to piston 34. Radially extending from the chamber 38 perpendicular to a longitudinal axis thereof, may be a plurality of passages 40 that coincide in number and align with the exhaust ports 24. Supply conduit 30 mentioned previously may be concentrically coupled to housing 36 by a suitable means, such as threaded coupler 44, so as to be in fluid communication with a longitudinal passage 42 which in turn enters chamber 38. Passages/ports 40 are placed in fluid communication with longitudinal passage 42 by ducts 46 and 47. In another embodiment, member 34 may be spherical in shape and contain similar conduits 46 and 47. In addition, only two passages 40 are shown in FIG. 5. It should be understood that many such passages/ports may radially pass through the member 36 equidistant from each other. An advantage of having more passages 40 is that the upper frequency range of operation may be extended without requiring a high rpm (revolutions per minute) driver 28. Likewise, FIG. 5 illustrates one duct 46 in piston 34. It should be noted that duct 46 could form a "T" junction and pass diametrically through cylinder 34, reducing the side loads on cylinder 34.

Access to cylinder 34 and the chamber 38 may be provided through end plate 48 anchored concentrically to one end of housing 36 by bolts 50. End plate 48 may contain an axial hole 52 through which a shaft 54 of the drive 28 may extend therethrough and engage cylinder 34. O-ring seals 56 may be provided within hole 52 and about shaft 54 so as to insure the integrity of the drive from invading fluid.

The entire valve mechanism 26 and drive 28 are received within the actuator assembly 22. The diameter of the housing and end plate are such that a tight fit occurs and that passages 40 align with the exhaust ports 24. O-ring seals 57, 58 may be provided about the circumference of the valve mechanism 26 again to provide protection to the drive 28.

Figure 6:
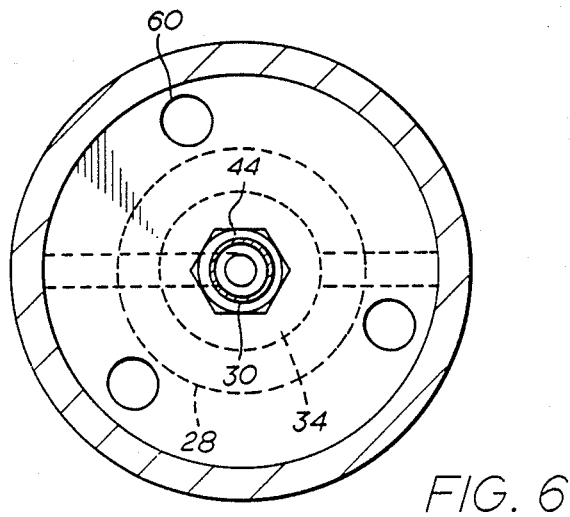
FIG. 6 is a plan view of a cross-section in FIG. 5.

FIG. 6 provides a plan view of the actuator assembly 22 along lines 6—6 shown in FIG. 5. Several ducts such as 60 provide access of electrical conductor and other plumbing needs for the operating head 16 through the valve mechanism. The interior of the tool 10 is appropriately sealed to prevent invasion of the borehole fluid which may result in damage to the drive 28 or other components. Appropriate potting compounds, O-rings or gas pressurized chambers may be used.

Figure 7:
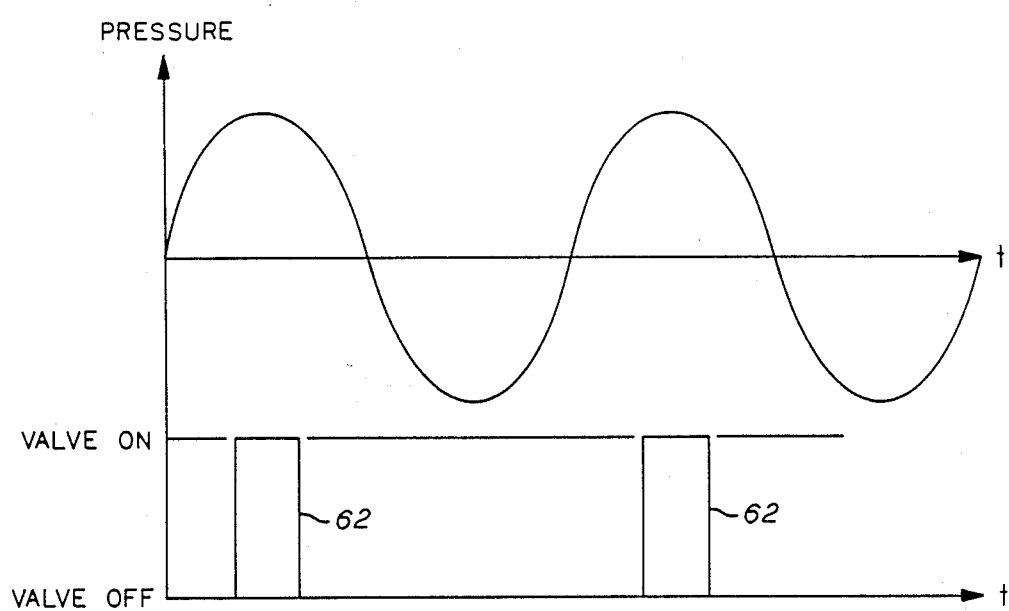
FIG. 7 is a phasing diagram.

The drive 28 operates the cylinder 34 within chamber 38. As the cylinder rotates within the chamber, fluid is introduced through supply conduit 30. The fluid enters duct 46 and as the valve rotates, the duct becomes aligned with passages 40 and fluid is discharged through the exhaust ports into the borehole in a series of pulses. Each time fluid is discharged through an exhaust port, a pulse 62, such as that shown in FIG. 7 may be induced in the fluid within the borehole between operating heads 16 and 18. The frequency of the oscillation is controlled by the rate at which the drive 28 rotates the cylinder 34. The frequency is controlled to produce and enforce a pressure standing wave within the space defined between the operating heads 16 and 18. In the case of the configuration of the tool 10 as shown in FIG. 1, the distance between the operating heads 16 and 18, and the frequency of oscillation of the fluid will be chosen so that a standing half-wave will occur in the fluid between the two operating heads.

Figure 8:
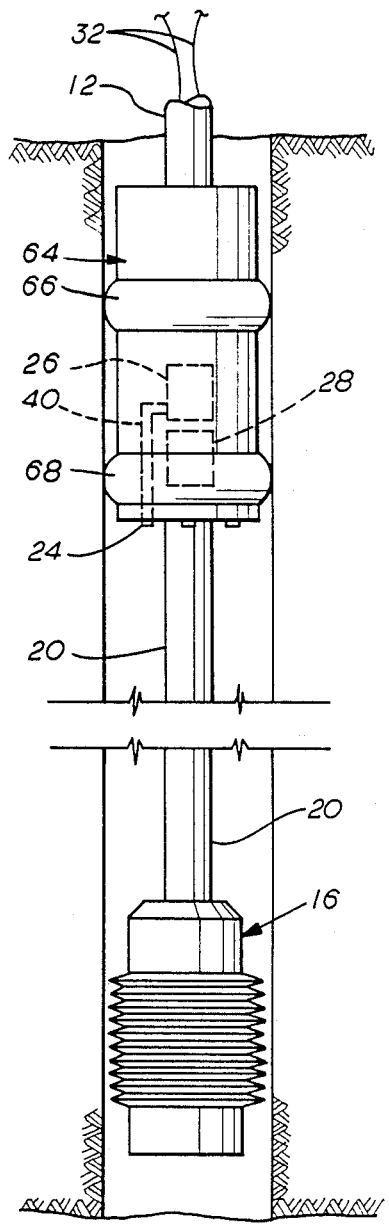
FIG. 8 is an elevational view of a second embodiment of this invention.

Turning now to FIG. 8, there is shown a second embodiment of the device 10 which is used when it is desired to produce a quarter wave oscillation in the fluid. In this case, the device includes a single operating head 16 identical in construction to that described in connection with FIG. 3. However, on the uphole end of the tool is a rigid operating head 64. Around the exterior of the operating head 64 may be rings 66 and 68 which are provided to allow the operating head 64 to be firmly engaged with the sidewalls of the borehole 14 so as to prevent the passage of drilling fluid around the rings 66 and 68.

A driving mechanism similar to that earlier described is provided with operating head 64, namely drive 28 and valve mechanism 26. In this embodiment, the exhaust ports 24 exit along the lower surface of operating head 64. Conduit 20 extending between the operating head 64 and operating head 16 is in this case continuous throughout its length and contains no actuator assembly 22 as shown in the earlier described embodiment.

The embodiment shown in FIG. 8 operates on the principle described schematically in FIG. 2 wherein the oscillations within the drilling fluid between the operating head 64 and the operating head 16 establish a quarter-wave length standing wave. In this embodiment it is important that one end of the tool includes an operating head having a flexible bladder as described in U.S. Pat. No. 4,671,379, and the other end having a rigid operating head in fluid tight engagement with the borehole 14.

In each of the embodiments mentioned above, the pulsation damper 70, such as schematically shown in FIG. 4, may be connected in parallel with supply conduit 30 to compensate for pressure variations in the conduit 30 when the valve 26 is opened and closed. Its basic function is to assure constant pressure of the ejected fluid into the borehole space between the operating heads during operation.

As previously indicated, the distance between the operating heads directly effects the natural frequency of the fluid therebetween. As the operating heads are moved toward each other symmetrically with relation to the exhaust ports 24, the natural frequency increases. By observing the relative phase of the cylinder 34 and the induced AC component of borehole pressure detected by a sensor, an indication is derived of the relation of exciting frequency to instantaneous natural frequency of the cavity between the operating heads 16, 18. This phase relative to 90 degrees is used to speed up or slow down the excitation frequency of the cavity generating the maximum pressure response for given input.

Control of the borehole AC pressure amplitude may be achieved in one of two ways. A measure of the amplitude may be fed back to control fluid pressure upstream of valve 26. In an alternative embodiment, the valve 26 may be operated slightly out of phase with respect to the resonant frequency defined by the space between the operating heads.

Thus, the invention provides an improved technique for generating seismic waves in a borehole which can be accurately controlled both in terms of the amplitude of pressures generated in a borehole as well as the frequency of the seismic wave. The peak pressure can be varied by controlling the pumped pressure of the fluid. The frequency can be varied by varying the distance between the operating heads and the rate fluid is introduced, or by varying the apparent compressibility of the fluids described in U.S. Pat. No. 4,671,379.

In an alternate embodiment of the actuator of this invention, the valve mechanism may be a cylinder which axially reciprocates within the tool 10. At a distal end of its stroke, the cylinder may block the exhaust ports. As the cylinder moves towards the opposite end of its stroke, the exhaust ports are opened and fluid is pulsed into the borehole. The exhaust ports are closed upon the return stroke of the cylinder. The frequency of the opening of the exhaust ports may be controlled in much the same manner as the embodiment described above.

While in the foregoing specification, the invention has been described in considerable detail, such detail is provided for the purposes of illustration and not by way of limitation, the invention itself being defined by the scope of the appended claims.

What is claimed is:

1. An apparatus for generating a seismic wave in a borehole comprising:
   (a) a pair of end means positioned in said borehole and separated from each other by a preselect distance;
   (b) rotary means selected from the group consisting of a ball valve means or a cylinder valve means, in fluid communication with the borehole space between said end means for inducing oscillations in a fluid located in said borehole space, whereby the fluid within said space generates a standing pressure wave.

2. The apparatus of claim 1, wherein at least one of said end means includes a resilient gas filled bladder in communication with said fluid.

3. The apparatus of claim 2, wherein at least one of said end means is moveable with respect to the other.

4. The apparatus of claims 1-3, wherein said fluid located in said borehole space is drilling mud.

5. The apparatus of claim 1, wherein at least one of said end means is in rigid fluid-tight contact with said borehole.

6. The apparatus of claim 1, wherein one of said end means is in rigid fluid tight contact with said borehole and the other of said end means includes a resilient gas bladder.

7. An apparatus for generating a seismic wave in a borehole containing a fluid, said apparatus comprising:
   (a) first and second end means positioned in said borehole and separated from each other by a predetermined distance;
   (b) connecting means between said first and second end means and including a central portion;
   (c) rotary means selected from the group consisting of a ball valve means or a cylinder valve means, housed within said central portion for inducing oscillations in said drilling fluid between said first and second end means, whereby the oscillations of said fluid generate a resonant standing pressure wave having a resonant frequency; and
   (d) means for varying the resonant frequency of oscillation of said fluid over a range of frequencies.

8. The apparatus of claim 7, wherein said rotary means for inducing oscillations comprises:
   a housing having at least one exhaust port and fluid inlet means;
   a said rotary means concentrically disposed within said housing and having a rotation axis concentric therewith, said rotary means including a duct for placing said exhaust port and said fluid inlet means in fluid communication with each other at predetermined intervals; and
   means for rotating said rotary means at a predetermined frequency.

9. The apparatus of claim 7, wherein said fluid is oscillated at a frequency of natural resonance determined by the predetermined distance between said first and second means.

10. The apparatus of claim 7 wherein said first and second end means are moveable relative to each other whereby the natural resonant frequency of the fluid column therebetween may be varied.

11. An apparatus for generating a seismic wave in a borehole containing drilling fluid, said apparatus comprising:
   (a) first end means positioned in said borehole in rigid, fluid tight position;
   (b) second end means spaced from said first end means in said borehole;
   (c) rotary means selected from the group consisting of a ball valve means or a cylinder valve means, located in said first end means for exciting said fluid into oscillation between said first and second end means at a resonant frequency of oscillation sufficient to create and maintain a resonant standing pressure wave between said first and second end means; and
   (d) means for varying the resonant frequency of oscillation of said fluid over a range of frequencies.

12. The apparatus of claim 11 wherein said rotary means for exciting said fluid comprises said valve means mounted in said first end means and in fluid contact with said fluid and in fluid communication with a fluid supply, rotation of said valve means introduces said fluid into said borehole at a frequency corresponding to said resonant frequency of oscillation.

* * * * *